US012188266B2

(12) United States Patent
Müller et al.

(10) Patent No.: US 12,188,266 B2
(45) Date of Patent: Jan. 7, 2025

(54) GOODS ANTI-THEFT DEVICE

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 236 days.

(21) Appl. No.: 17/430,433

(22) PCT Filed: Feb. 7, 2020

(86) PCT No.: PCT/EP2020/053117

§ 371 (c)(1),
(2) Date: Aug. 12, 2021

(87) PCT Pub. No.: WO2020/165038

PCT Pub. Date: Aug. 20, 2020

(65) Prior Publication Data

US 2023/0243190 A1 Aug. 3, 2023

(30) Foreign Application Priority Data

Feb. 15, 2019 (DE) ..................... 10 2019 202 098.4

(51) Int. Cl.
*E05B 73/00* (2006.01)
*E05B 67/28* (2006.01)

(52) U.S. Cl.
CPC .......... *E05B 73/0047* (2013.01); *E05B 67/28* (2013.01); *E05B 73/0017* (2013.01)

(58) Field of Classification Search
CPC ............................. E05B 67/28; E05B 73/0047
See application file for complete search history.

(56) References Cited

U.S. PATENT DOCUMENTS 6,046,558 A * 4/2000 Larson ............... G07C 9/00896 318/281
2008/0100457 A1* 5/2008 Gray .................. E05B 73/0005 340/572.9

(Continued)

FOREIGN PATENT DOCUMENTS

GB 191111648 A 11/1911
WO 2005118992 A2 12/2005

(Continued)

OTHER PUBLICATIONS

International Application No. PCT/EP2020/053117, International Search Report and Written Opinion, May 27, 2020, 12 pages.

*Primary Examiner* — Daniell L Negron
(74) *Attorney, Agent, or Firm* — Kilpatrick Townsend & Stockton LLP

(57) ABSTRACT

The invention relates to an anti-theft device (100) configured for being attached to merchandise to be protected, in particular textile products, wherein the anti-theft device (100) comprises a housing (102) and a locking mechanism (130), which has a needle (106), wherein the needle (106) is adjustable between a locking position, in which it engages with the merchandise to be protected, and a release position, in which detachment and removal of the anti-theft device (100) from the merchandise to be protected are permitted, wherein the needle (106) has a curved, preferably arcuate shape and is accommodated in the housing (102) when in the release position.

17 Claims, 2 Drawing Sheets

(56) References Cited

U.S. PATENT DOCUMENTS

Figure 1:
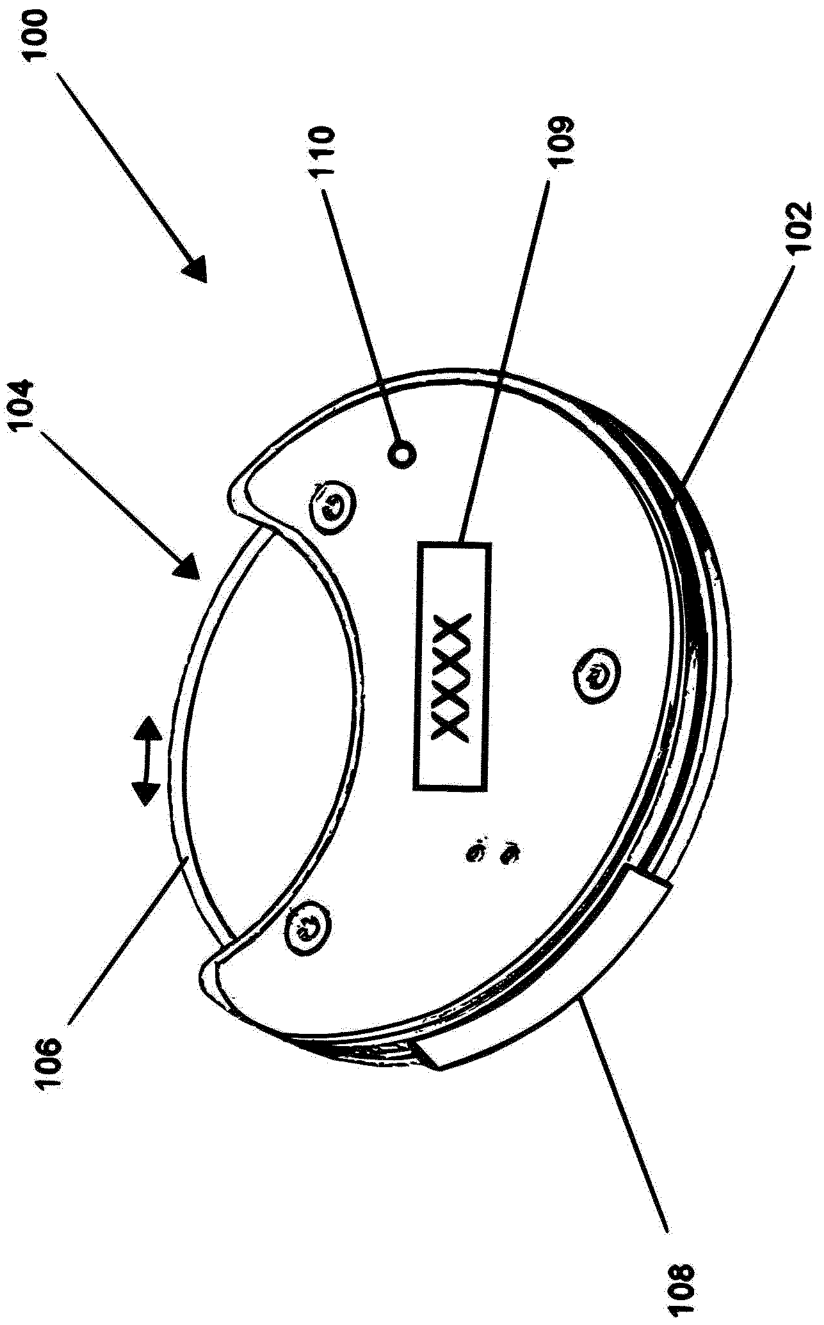

| | | | | |
|---|---|---|---|---|
| 2016/0027271 A1* | 1/2016 | Paul | E05B 73/0017 | |
| | | | 340/572.1 | |
| 2016/0321894 A1* | 11/2016 | Schneider | G08B 13/242 | |

FOREIGN PATENT DOCUMENTS

| | | | |
|---|---|---|---|
| WO | 2008153476 | A1 | 12/2008 |
| WO | 2016141039 | A1 | 9/2016 |

* cited by examiner

GOODS ANTI-THEFT DEVICE

CROSS REFERENCE TO RELATED APPLICATION

This application is a U.S. national phase of International Patent Application No. PCT/EP2020/053117 filed on Feb. 7, 2020, which claims priority to German Patent Application No. 10 2019 202 098.4, filed in Germany on Feb. 15, 2019. The entire contents of both applications are hereby incorporated herein by this reference.

The invention relates to an anti-theft device configured to be attached to merchandise to be protected, in particular textile products.

Anti-theft devices have been preferentially used for many years in the field of stores open to the public, as they provide sufficient protection against unauthorized removal from the store, or from or a demarcated sales area within said store, of merchandise sold therein. For this purpose, appropriate detector units are usually provided at all entrances and exits of the store, or of any demarcated sales areas therein, and these are designed and intended to emit an acoustic and/or visual warning signal if a customer attempts to remove any protected merchandise to which an anti-theft device of this kind is attached from the store or sales area without authorization, i.e., without paying for it beforehand.

Particularly in the field of textile products, anti-theft devices of this kind usually comprise a multi-part housing and a locking mechanism, which has a needle that, when in a locked state, engages with the merchandise to be protected in such a way that the anti-theft device cannot be removed from the merchandise to be protected, or at least not without destroying the merchandise to be protected in the process.

If, for example, an anti-theft device of this kind is provided with a two-part housing, then in order to assemble the anti-theft device on the textile product to be protected a first housing part is usually attached to the outside of the textile product and a second housing part is attached to a corresponding internal side of the textile product, and the textile product part located in between the two housing parts is pierced by a needle that, for example, has been attached beforehand to one of the two housing parts, in such a way that the needle can latch to the other of the two housing parts, thereby interconnecting the textile product and the two housing parts by means of the needle.

To open the locking mechanism of an anti-theft device that is attached to a textile product in this way, in the customer service or checkout area of a store there are usually appropriate unlocking devices which can generally be operated only by the sales staff, are magnetic or have another kind of mechanical action, and are designed and intended to release the locking mechanism of the anti-theft device such that the needle can be removed from the anti-theft device and the two housing parts of the anti-theft device can be separated from each other again.

Once disassembled into their individual components, the anti-theft devices are then often collected at the place where they were disassembled and reused elsewhere later by being reattached, in the manner described above, to other merchandise to be protected.

It should be noted, however, that there is an increased risk of injury to sales staff, particularly during an assembly and/or disassembly operation for anti-theft devices of this kind, since handling a needle, which is generally an extremely sharp object, is always associated with a certain risk of injury. Furthermore, during the usual high number of assembling and/or disassembling operations, it is also possible that a needle falls unnoticed to the floor, ultimately leading to an increased risk of injury not only to sales staff but also to customers.

In addition, multi-part anti-theft devices of this kind are generally relatively inconvenient to handle, resulting in long handling times and thus financial drawbacks. Moreover, the dimensions of anti-theft devices of this kind can in general be perceived as annoying, especially when trying on textile products.

The object of the present invention is therefore to provide an anti-theft device that is improved in this regard.

According to a first aspect of the invention, this object is achieved by an anti-theft device that is configured for being attached to merchandise to be protected, in particular textile products, the anti-theft device comprising a housing and a locking mechanism, which has a needle, the needle being adjustable between a locking position, in which it engages with the merchandise to be protected, and a release position, in which detachment and removal of the anti-theft device from the merchandise to be protected are permitted, the needle having a curved, preferably arcuate shape and being accommodated in the housing when in the release position.

Since the needle is accommodated in the housing when in the release position, the anti-theft device according to the invention has a significantly lower risk of injury compared with known anti-theft devices since the needle is not detached from the anti-theft device when said device is opened; instead, it always remains connected to the anti-theft device, so when the anti-theft device is in a configuration ready for operation the needle need not be handled as a separate component of the anti-theft device, nor can it accidentally fall to the floor or be otherwise separated from the anti-theft device, which is undesirable.

Since, according to the invention, the needle has a curved, preferably arcuate shape, a particularly compact design of the housing can also be achieved as the only installation space required to accommodate the needle is that corresponding to the curvature of the needle. As a result, the housing of the anti-theft device according to the invention can have reduced dimensions in a main-extent direction of the needle compared with anti-theft devices having non-curved needles.

To minimize the risk of injury during handling, the needle can also be accommodated entirely within the housing when in the release position.

Furthermore, to ensure simple and time-efficient handling of the anti-theft device according to the invention, the anti-theft device, when in a state ready for operation, can be formed in one piece, with preferably all functional components of the anti-theft device being able to be attached in and/or to the single housing of the anti-theft device.

To further ensure that the anti-theft device cannot be opened in an unauthorized manner, i.e., for example before a payment process is complete, according to the invention it is further proposed that the locking mechanism comprises a catch configured to be able to be releasably engaged with the needle in order to hold the needle in the locking position and allow it to be transferred to the release position when actuated by a release element associated with the catch. In principle, it is conceivable for the release element to also be arranged in or on the housing of the anti-theft device.eff In principle, the release element can be in the form of a mechanical and/or motorized release element. However, to implement a catch that is particularly compact and at the same time reliable, according to a preferred embodiment of the present invention the release element may be made at least in part of a shape-memory alloy. For example, thermally and/or magnetically activatable shape-memory alloys can be used, which are preferably configured such as to have a resting or default state, in which the catch remains locked such that the needle is held in its locking position, and an excited state, in which the catch is actuated in such a way as to allow the needle to be transferred to the release position.

Furthermore, to be able to attach and/or fasten the anti-theft device according to the invention in a particularly simple manner to a product to be protected, the locking mechanism may further comprise an actuation element configured to transfer the needle to the locking position when manually actuated by an operator. As a result of an actuation element of this kind being provided, an operator can, for example, use one hand to handle the anti-theft device and actuate the actuation element during the assembling operation, while the other hand remains free for handling the merchandise to be protected, in particular a textile product.

To further allow the anti-theft device to be opened in a particularly convenient manner, for example once a payment process is complete, in a development of the invention it is proposed that the needle is preloaded in the direction of its release position, preferably by means of a spring. This can ensure that the needle can, if desired, be transferred to its release position without any additional force exertion, for example by potential energy stored in a spring.

For the anti-theft device to be generally pleasant to handle and/or also satisfy aesthetic requirements in relation to certain merchandise to be protected, it is also preferred for the housing to have a substantially circular and/or elliptical or polygonal contour. In this regard, the shape of the housing can in particular be adapted to the nature and extent of the curvature of the needle, such that a particularly compact design of the anti-theft device can be implemented and the needle can substantially follow the shape of the housing, in particular when being transferred to the release position.

Moreover, in order for the anti-theft device to have a sufficient degree of freedom with respect to different methods and/or locations for being attached to merchandise to be protected, the housing may further have a cut-out that preferably extends substantially radially, the cut-out being configured to receive at least one part of the merchandise to be protected. In principle, the cut-out can be of any shape and, for example, can be a cut-out that extends at a constant width and/or a cut-out that tapers and/or widens.

To also be able to apply the anti-theft device to merchandise having particularly thick walls, in particular garments having a high fabric thickness and/or high fabric weight, according to a particularly preferred embodiment of the invention it is proposed that the cut-out is substantially in the shape of a sector of a circle.

In principle, it is conceivable to supply any mechanical and/or electrical energy required for operation to the anti-theft device externally. However, if the anti-theft device is also intended to operate autonomously or at least partly autonomously and/or to be capable, for example, of opening and/or closing automatically and/or to have other functions that require a regular supply of energy, it is preferred that it further comprises a power supply unit, preferably a battery. In particular, the power supply unit can be arranged in or on the housing of the anti-theft device and is preferably rechargeable multiple times.

To implement particularly convenient opening of the anti-theft device, in a development of the invention it is proposed that said device further comprises a signal-receiving unit, the anti-theft device being configured to cause the needle to be transferred to the release position when the signal-receiving unit receives a release-initiation signal. The release-initiation signal may be intended for opening a single predetermined anti-theft device and/or for opening a plurality of predetermined anti-theft devices. The release-initiation signal is preferably an encrypted signal, which can in particular protect against unwanted tampering attempts and/or counteract unauthorized opening of the anti-theft device.

To additionally or alternatively be able to provide particularly convenient closing of the anti-theft device, the anti-theft device can furthermore be configured to cause the needle to be transferred to the locking position when the signal-receiving unit receives a locking-initiation signal.

The signal-receiving unit can basically be configured in such a way that the release-initiation signal and/or the locking-initiation signal is/are transmitted to the signal-receiving unit by means of a wireless connection (e.g. WLAN, Bluetooth) by a central control unit that is preferably arranged in the vicinity of the anti-theft device. However, it is also conceivable for the signal-receiving unit to be designed and intended to receive signals from a mobile terminal, preferably of a customer.

In principle, however, the signal-receiving unit need not be limited to being able to receive only release-initiation signals and/or locking-initiation signals. If, for example, product-related and/or other information are intended to be able to be received and also stored on the anti-theft device for a specific and/or indefinite period of time, according to a development of the invention it is preferred that the anti-theft device further comprises a storage apparatus, the anti-theft device further being configured to receive a product information signal and store it on the storage apparatus. The product information signal can include product-related and/or other information such as a price, in particular a customer-specific price, and/or an article/manufacturer name and/or size information and/or availability information and/or similar other information relating to the merchandise protected by the anti-theft device. Analogously, the product information signal can also be transmitted to the anti-theft device, for example, by means of a wireless connection (e.g. WLAN, Bluetooth) via a central control unit that is preferably arranged in the vicinity of the anti-theft device. However, it is also conceivable to transmit the product information signal to the anti-theft device over the wireless connection by means of a mobile terminal, preferably of a customer. If the mobile terminal is a mobile terminal of a customer, it is also possible to transfer to the anti-theft device a price specifically assigned to the customer in question. The price can be provided by an application, for example an app, that is preinstalled on the mobile device and communicates with a merchandise sales system. In this way, it is also possible for a customer to carry out the entire sales process, i.e., payment and removal of the anti-theft device from the protected merchandise, independently and without further assistance from additional sales staff.

Furthermore, to make the anti-theft device particularly versatile, the signal-receiving unit may additionally be designed and intended to receive signals from a smartphone and/or a tablet PC and/or a smartwatch.

In general, to transmit the signals it is preferable to use a communications standard that provides compatibility with a particularly large number of mobile terminals of this kind. It may also be desirable to use encrypted signals to ensure a particularly secure connection. Furthermore, it is advantageous to use a communications standard that requires a particularly low amount of energy such that, for example, a battery of the anti-theft device can be conserved. Bluetooth, for example, provides a communications standard that is particularly well suited to meeting said requirements.

In principle, however, in addition to a signal-receiving unit, the anti-theft device can also additionally or alternatively comprise a signal-transmitting unit configured to transmit the product information signal to a mobile terminal, preferably in response to a product-information request operation. The product-information request operation can involve both receiving a corresponding request signal and manually actuating the anti-theft device, the signal-transmitting unit being made to transmit the product information signal for a certain period of time in each case.

Furthermore, if the anti-theft device comprises both a signal-receiving unit and a signal-transmitting unit, bidirectional communication between the mobile terminal and the anti-theft device can be provided. In this context, it is also conceivable for the anti-theft device to be able to be located by the mobile terminal while they are in communication with each other. By way of example, a customer can thus be guided in a simple manner to a product they are looking for that has the anti-theft device attached to it. Bluetooth, for example, is again suitable as a particularly preferred communications standard in this respect.

To be able to provide a particularly good identifying and/or locating function in the anti-theft device, the anti-theft device can furthermore be assigned a unique identification code, for example an identification number, which is preferably provided for identifying the merchandise protected by the anti-theft device and, if desired, for determining a location of the anti-theft device. The unique identification code can be transmitted to the anti-theft device, preferably by means of Bluetooth, and stored by a storage apparatus of the anti-theft device.

If the product information associated with the protected merchandise is intended not only to be displayed on the mobile terminal, for example, but also to be at least partly displayable on the anti-theft device itself, according to a preferred embodiment of the present invention it is proposed that the anti-theft device further comprises an indicator apparatus, for example a display, provided on an external surface of the housing. The display can be an "ePaper display" or an "eInk display", for example. It goes without saying, however, that in principle just a barcode or another ID can also be attached to the housing of the anti-theft device.

Furthermore, to be able to indicate in a simple manner whether the anti-theft device is in a state ready for operation and/or a locked state and/or an unlocked state and/or whether the anti-theft device may have malfunctioned and/or whether a battery of the anti-theft device needs charging, said device may further comprise a status-indicating apparatus, preferably an LED light source, provided on an external surface of the housing.

Lastly, according to a further embodiment, the anti-theft device according to the invention may further comprise a securing element, for example an electronic article surveillance element (EAS element), which is configured to interact with an article surveillance system, preferably an electronic article surveillance system. In particular, it can be provided that if a customer attempts to remove any protected merchandise to which the anti-theft device according to the invention is attached from a store or a sales area without authorization, i.e., without paying for it beforehand, a preferably acoustic and/or visual alarm signal is emitted. The alarm signal can be emitted, for example, at the exact moment the anti-theft device passes a detector unit associated with the electronic article surveillance system. In the process, the alarm signal can be emitted at the detector unit itself and/or at the anti-theft device; if desired, a corresponding alarm apparatus configured to output the alarm signal can be provided for this purpose. Alternatively or additionally, the EAS element can be supported by, for example, an RFID, Bluetooth and/or WLAN chip module, which is preferably configured to be able to unambiguously identify the anti-theft device.

To also ensure that a customer, after having paid for the merchandise and removing the anti-theft device therefrom independently, cannot remove the anti-theft device from the sales area undetected, it is also conceivable that the alarm signal is emitted even if the customer has already paid for the merchandise protected by the anti-theft device. Basically, this can ensure that the anti-theft devices can be used several times and cannot be carried away by customers undetected and/or accidentally.

According to a further aspect of the invention, which can preferably be combined with the first aspect, the object is further achieved by an anti-theft device that is configured for being attached to merchandise to be protected, in particular textile products, the anti-theft device comprising a housing and a locking mechanism, which has a needle, the needle being adjustable between a locking position, in which it engages with the merchandise to be protected, and a release position, in which detachment and removal of the anti-theft device from the merchandise to be protected are permitted, the housing having a substantially planar shape having a main plane, and the needle being configured so as to be arranged substantially in the main plane of the housing when in both the locking position and the release position.

In particular, the anti-theft device according to the second aspect of the present invention provides the advantage whereby the housing of the anti-theft device can have a particularly planar and thus compact design. If the anti-theft device according to the invention is used, for example, on textile products, configuring the housing in a planar manner in this way leads to less of an impairment of the wearing comfort compared with known anti-theft devices, in particular when textile products of this kind are tried on in a store, during which the anti-theft device usually remains fastened to the textile product to be protected, and without hindering the required security function in the process.

With respect to the further advantages and effects of the anti-theft device according to the second aspect of the present invention, reference is made to the above explanations with respect to the anti-theft device according to the first aspect.

Figure 2:
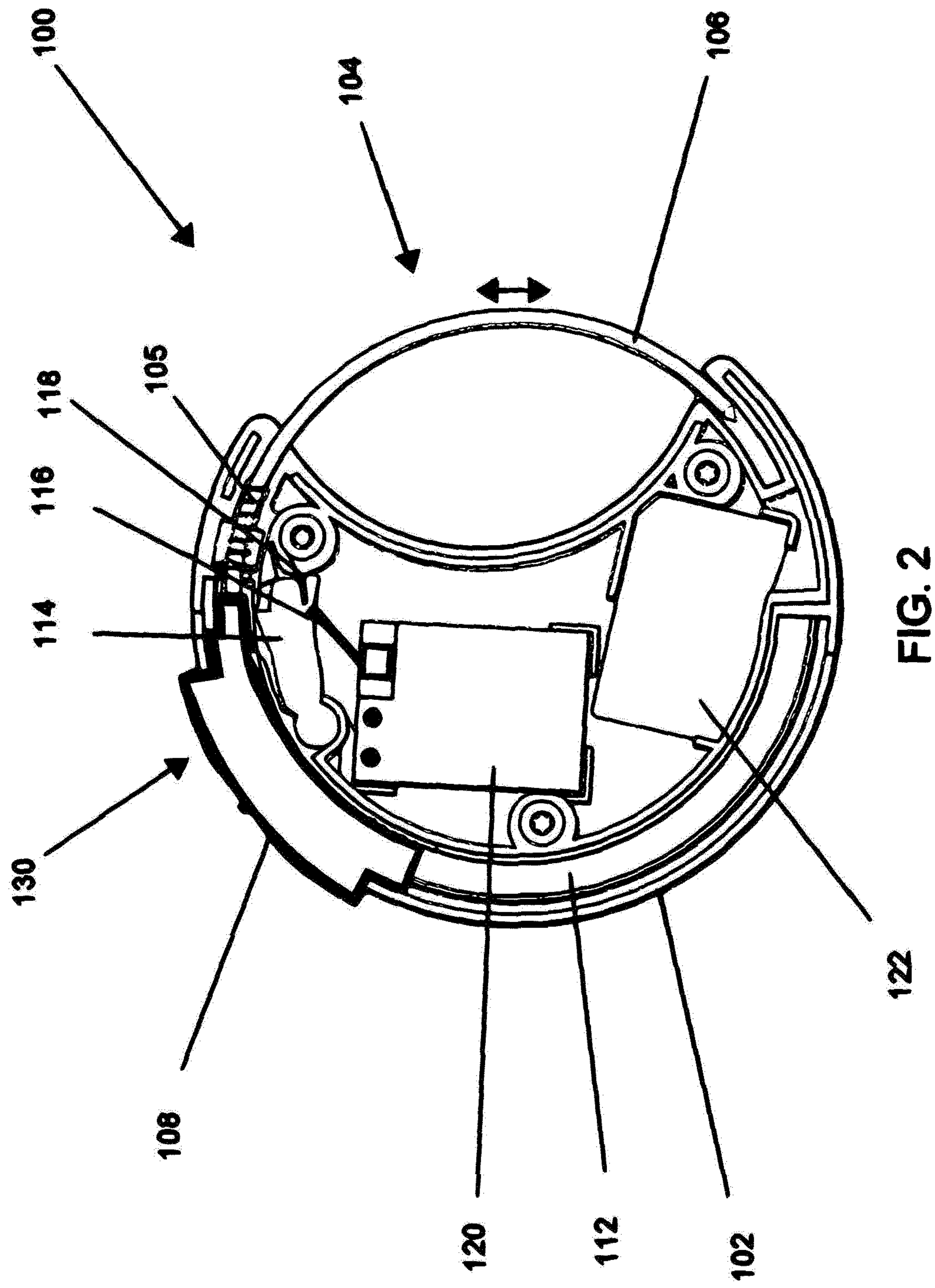

The invention will be described below in more detail on the basis of the accompanying drawings, in which:

FIG. 1 is a perspective view of an embodiment example of an anti-theft device according to the invention; and FIG. 2 is a sectional view of the embodiment example of the anti-theft device according to the invention.

FIG. 1 denotes an anti-theft device according to the invention in general as 100. In the embodiment example shown, the anti-theft device 100 comprises a housing 102, which is in the form of a substantially disk-shaped housing. The housing 102 is also provided with a cut-out 104, which extends radially inward from a circumferential edge of the housing 102 and, in the illustrated embodiment example, is substantially in the shape of a rounded sector of a circle. At this point, however, it should be noted that neither the shape of the housing 102 nor the shape of the cut-out 104 is limited to the embodiment example shown and may in principle be of any shape. For example, the shape of the cut-out 104 may also be the shape of a sector of a circle or a segment of a circle, or of a radially inwardly extending gap of constant width.

The anti-theft device 100 further comprises a needle 106, which, in the embodiment example shown, has an arcuate shape and is displaceable in the circumferential direction as indicated by a double arrow. In the embodiment example shown, the needle 106 is shown in a locking position, in which it can engage with, for example, a textile product to be protected (not shown) or another item of merchandise to be protected. By moving the needle 106 (in FIG. 1 substantially counterclockwise in its circumferential direction), the needle 106 can be transferred to a release position, in which it is preferably accommodated entirely within the housing 102 such that the needle 106 does not create any risk of injury for an operator handling the anti-theft device 100.

While the needle 106 is in its release position, the merchandise to be protected can be inserted into the cut-out 104 and then engaged with the merchandise to be protected by transferring the needle 106 to the locking position shown in FIG. 1. If the merchandise to be protected is a textile product, the needle 106, which in that case may be configured to be relatively thin to protect the textile product, may pierce said textile product in order to be then securely attached to the textile product to be protected. However, the needle 106 need not necessarily pierce the merchandise to be protected, but rather may also, in order to be attached, engage with a loop and/or tab provided on the merchandise to be protected.

An actuation element 108 may further be provided on the housing 102 for moving the needle 106, the actuation element being designed and intended to be actuated, for example, by a thumb of an operator such that the needle 106 can be transferred from its release position to the locking position shown. As soon as the needle 106 is in the locking position, it can further engage or latch with a catch (not shown in FIG. 1), which will be described in more detail below, in order to be securely held in the locking position so as to prevent unauthorized opening or removal of the anti-theft device 100 from the merchandise to be protected.

The anti-theft device 100 further comprises an indicator apparatus 109, which, in the embodiment example shown, is in the form of a display 109. The display 109 may be configured to display one or more pieces of product information, such as a price and/or an article/manufacturer name of the merchandise protected by the anti-theft device 100.

To indicate a status of the anti-theft device 100, an LED light source 110 is further provided on the housing 102, which LED light source may be configured as a colored LED light source, for example. By way of example, it is conceivable that the LED light source 110 illuminates in the color red to indicate a locked state of the anti-theft device 100, whereas the color green may be selected as the illuminating color to indicate an unlocked state. However, it goes without saying that any such LED light source 110 may also have a plurality of other illumination states/colors that may be used, for example, to indicate other operational states of the anti-theft device 100.

With reference to FIG. 2, which is a sectional view of the anti-theft device 100 from FIG. 1, a receiving space 112 located in the housing 102 can be seen, said receiving space being configured to receive the needle 106 which has been transferred to the release position. To lock the needle 106 in the locking position, the anti-theft device 100 further comprises a catch 114, which is configured to engage with the needle 106 such that the needle is no longer displaceable in the circumferential direction once it latches with the catch 114, for example after being displaced by means of the actuation element 108. To open the catch 114, the catch is operatively connected to a release element 116, which, in the embodiment example shown, is in the form of a wire 116 made of a shape-memory alloy. The wire 116 is connected to a chip unit 120, which heats said wire by applying electrical power. Furthermore, the wire 116 is operatively connected to the catch 114 such that the catch 114 can be moved inwardly substantially in the radial direction and opened as a result of the wire 116 contracting. For as long as the catch 114 is displaced inward in the radial direction, as shown in FIG. 2, the needle 106 can be displaced in its circumferential direction, by means of actuation of the actuation element 108, and transferred to its release position.

To enable particularly convenient opening, the needle 106 is further associated with a spring 105, which is also accommodated in the housing 102 and is designed and intended to move the needle 106 in the direction of its release position as soon as the catch 114 is moved radially inward and the needle 106 is released. Furthermore, to transfer the needle 106 entirely into the housing 102 or the receiving space 112, the actuation element 108 may, if desired, be actuated accordingly.

Once the wire 116 has subsequently cooled and thus expanded, the catch 114 can move (in the embodiment example shown with assistance from a further spring 118 connected to the housing 102) radially outwardly again such that the catch 114 can latch with the needle 106 again when said needle is transferred back to the locking position.

Consequently, in the embodiment example shown the needle 106, the actuation element 108, the catch 114, the wire 116, and the spring 118, together with the chip unit 120, form a locking mechanism 130 of the anti-theft device 100.

To provide the power required to operate the chip unit 120 and thus heat the wire 116, the anti-theft device 100 is further provided with a battery 122, which is also arranged in the housing 102.

The chip unit 120 may further be equipped with a signal-receiving unit and/or a signal-transmitting unit, which is/are configured preferably to communicate with a mobile terminal of a customer. By way of example, it is thus possible for the chip unit 120 to cause the wire 116 to be heated only after a locking-initiation signal is received by the signal-receiving unit included in the chip unit 120. The locking-initiation signal is preferably not sent by the mobile terminal to the signal-receiving unit until the customer has successfully completed a payment process.

Lastly, the chip unit 120 may further comprise a memory unit, which is preferably integrated therein and configured to store, inter alia, the product information relating to the merchandise to be protected, which information may be displayed on the display 109.

It should be added that the anti-theft device 100 can further comprise an electronic article surveillance element (EAS element) (not shown in FIG. 2) which is configured to interact with an electronic article surveillance system (not shown either) such that when a customer attempts to remove protected merchandise to which the anti-theft device 100 is attached from a store, for example, without authorization, an acoustic and/or visual alarm signal is emitted as soon as the merchandise passes a detector unit associated with the electronic article surveillance system.

The invention claimed is:

1. Anti-theft device configured to be attached to merchandise to be protected comprising:

a housing and a locking mechanism which has a needle, the needle being adjustable between a locking position, in which it engages with the merchandise to be protected, and a release position, in which detachment and removal of the anti-theft device from the merchandise to be protected are permitted, wherein the needle has a curved shape and is accommodated in the housing when in the release position, wherein the locking mechanism comprises a catch that is configured such that it can be releasably engaged with the needle in order to hold the needle in the locking position and allow it to be transferred to the release position when actuated by a release element associated with the catch, wherein the release element is made at least in part of a shape-memory alloy.

2. Anti-theft device according to claim 1, wherein the locking mechanism further comprises an actuation element configured to transfer the needle to the locking position when manually actuated by an operator.

3. Anti-theft device according to claim 1, wherein the needle is preloaded in the direction of its release position.

4. Anti-theft device according to claim 3, wherein the needle is preloaded by means of a spring.

5. Anti-theft device according to claim 1, wherein the housing has a substantially circular and/or elliptical or polygonal contour.

6. Anti-theft device according to claim 1, wherein the housing further has a cut-out that extends substantially radially, the cut-out being configured to receive at least one part of the merchandise to be protected.

7. Anti-theft device according to claim 6, wherein the cut-out is substantially in the shape of a sector of a circle.

8. Anti-theft device according to claim 1, further comprising a power supply unit.

9. Anti-theft device according to claim 8, further comprising a signal-receiving unit, the anti-theft device being configured to cause the needle to be transferred to the release position when the signal-receiving unit receives a release-initiation signal.

10. Anti-theft device according to claim 9, wherein the anti-theft device is further configured to cause the needle to be transferred to the locking position when the signal-receiving unit receives a locking-initiation signal.

11. Anti-theft device according to claim 9, wherein the signal-receiving unit is configured to receive signals from a mobile terminal.

12. Anti-theft device according to claim 9, wherein the anti-theft device is assigned a unique identification code for identifying the merchandise protected by the anti-theft device and/or for determining a location of the anti-theft device.

13. Anti-theft device according to claim 8, further comprising a storage apparatus, the anti-theft device further being configured to receive a product information signal and store it on the storage apparatus.

14. Anti-theft device according to claim 8, wherein the power supply unit is a battery.

15. Anti-theft device according to claim 1, further comprising an indicator apparatus provided on an external surface of the housing.

16. Anti-theft device according to claim 15, wherein the indicator apparatus is a display.

17. Anti-theft device according to claim 1, further comprising a securing element configured to interact with an article surveillance system.

* * * * *